United States Patent [19]
Wang et al.

[11] Patent Number: 5,761,974
[45] Date of Patent: Jun. 9, 1998

[54] SYSTEM AND METHOD FOR MACHINING HEAT RESISTANT MATERIALS

[75] Inventors: Zhiyong Wang; Kamlakar Rajurkar, both of Lincoln; Murugappan Murugappan, Omaha, all of Nebr.

[73] Assignee: Board of Regents of the University of Nebraska, Lincoln, Nebr.

[21] Appl. No.: 685,987

[22] Filed: Jul. 22, 1996

[51] Int. Cl.⁶ .................................................. B23B 3/00
[52] U.S. Cl. ........................ 82/1.11; 407/11; 82/173
[58] Field of Search ........................... 407/11; 82/1.11; 408/56, 57

[56] References Cited

U.S. PATENT DOCUMENTS

| | | | |
|---|---|---|---|
| 2,391,794 | 12/1945 | O'Brien | 407/11 |
| 2,641,047 | 6/1953 | Jackman | 407/11 |
| 2,785,457 | 3/1957 | Pigott | 407/11 |
| 3,077,802 | 2/1963 | Philip | 82/173 |
| 3,137,184 | 6/1964 | Meyers . | |
| 3,571,877 | 3/1971 | Zerkle | 29/106 |
| 3,971,114 | 7/1976 | Dudley | 29/106 |
| 4,312,251 | 1/1982 | Schwan | 82/36 |
| 4,848,198 | 7/1989 | Royal et al. | 407/11 |
| 5,020,946 | 6/1991 | Nann | 409/136 |
| 5,103,701 | 4/1992 | Lundin et al. | 82/173 |

*Primary Examiner*—Daniel W. Howell
*Assistant Examiner*—Mark Williams
*Attorney, Agent, or Firm*—James D. Welch

[57] ABSTRACT

Disclosed is a cap-like reservoir defining system which allows user adjustable location of application of cutting tool lifetime increasing cryogenic cooling to a workpiece contacting edge of a cutting tool, in a workpiece machining system. The present invention method of use finds application in the machining of materials such as ceramics, heat resistant materials, titanium, inconel alloys, and super alloys.

9 Claims, 4 Drawing Sheets

1

SYSTEM AND METHOD FOR MACHINING HEAT RESISTANT MATERIALS

TECHNICAL FIELD

The present invention relates to the machining of materials, and more particularly is a system and method for machining ceramics, titanium alloys, inconel alloys, super alloys, iron and cobalt based alloys and heat resistant materials, which enables achieving superior results as evidenced by reduced machining tool wear, and improved machined material integrity as evidenced by reduced machined material cracking, damage and deformation.

BACKGROUND

The machining of materials such as ceramics, titanium alloys, inconel alloys, super alloys, iron and cobalt based alloys, heat resistant materials and the like presents a recognized and difficult problem. To machine such materials, it is generally known that a cutting tool with a workpiece contacting edge composed of a material with "hardness" and "strength" greater than that of the material being machined should be utilized, to minimize wear of the cutting tool and effect a useful lifetime thereof. Practical considerations then require that cutting tool materials typically be selected from a relatively small group consisting of diamond, polycrystaline cubic boron nitride, cemented carbide, ceramics and high speed steel.

Even with selection of an appropriate cutting tool material, it is to be understood that if the temperature thereof is allowed to increase during use, the hardness and strength thereof can greatly reduce, thereby causing the cutting tool to wear rapidly. For instance, even diamond, the hardest material known, being of a carbon based zinc-blend molecular configuration, converts to a relatively soft carbon based graphite molecular configuration, at approximately five-hundred-fifty (550) degrees centigrade. As well, cubic boron nitride, being of an hexagonal molecular configuration, converts to a relatively soft material at approximately fourteen-hundred (1400) degrees centigrade.

It is also noted that the temperature at which a machined material is maintained during a machining procedure can be an important determinant of the achieved end result, as regards machined material surface integrity and machining accuracy. For instance, maintaining a machined material workpiece at too low a temperature during machining can lead to cracking thereof, and maintaining said machined material workpiece at too high a temperature can lead to the presence of stress therein, to surface damage during machining, and to undesired shape change.

While the present invention does not exclude the possibility of controlling the temperature of a machined workpiece during use, the primary focus thereof is a system and method for cooling a workpiece contacting edge of a cutting tool. An easily understood reason for this is that heat resistant materials do not conduct heat well, and even tight control of the temperature of the bulk material of a machined workpiece does not guarantee control of the temperature at a machined surface thereof. That is, very high material property degrading thermal gradients can occur at such a surface. The present invention then focuses on effecting control of the temperature of a cutting tool workpiece contacting edge.

As the present invention is primarily focused upon the control of the temperature at a workpiece contacting edge of a cutting tool, a search of Patents in said area was conducted.

Perhaps the most relevant result of said search is a Patent to Meyers, U.S. Pat. No. 3,137,184. Said Patent describes a thermoelectric system which can be affixed near a workpiece contacting edge of a cutting tool. The presence of a fluid heat transfer system is mentioned as possible, but to flow of a coolant, (ie. liquified gas), through said described system is not described. The presence of flanges for contacting the sides of a cutting tool are described, and it is noted that said flanges serve to define a "cradle" into which a cutting tool is fit in use. Said "cradle", it is noted, identifies an optimum seated position of a cutting tool therein in use, thereby suggesting a limitation on position adjustability of said theremoelectric system with respect to a workpiece contacting edge of said cutting tool.

A Patent to Lundin et al. U.S. Pat. No. 5,103,701 describes a system for use in diamond machining of materials in which both a cutting tool and a machined workpiece are cooled during use. A refrigeration means for use in cooling said cutting tool is described, and it is noted that said refrigeration means can be a reservoir through which a liquified gas is caused to flow in use in use. However, providing cooling very near a workpiece contacting edge of a cutting tool is not addressed.

Another Patent, U.S. Pat. No. 3,571,877 to Zerkle describes a cutting tool with an internal cavity therein into which is caused to be entered a cooling vaporizable liquid, during use. While this is a very interesting invention as regards providing cooling very near a workpiece contacting edge of a cutting tool, it is noted that the presence of an internal cavity can lead to reduced cutting tool strength.

Another Patent, U.S. Pat. No. 4,312,251 to Schwan describes a cutting tool which comprises a coolant pipe with holes therein, said holes serving, in use, to allow coolant to eject therefrom into a space which effects cooling of the cutting tool, but which contains said coolant so that it does not contact a workpiece material.

A number of Patents, such as U.S. Pat. No. 5,020,946 to Nann, describe cooling of chucks and the like, rather than a cutting tool.

Additional Patents identified, many of which effect spray of a coolant onto a workpiece material during use are: U.S. Pat. No. 4,695,208 to Yankoff; U.S. Pat. No. 3,971,114 to Dudley; U.S. Pat. No. 4,955,264 to Armbrust; U.S. Pat. No. 5,340,242 to Armbrust; U.S. Pat. No. 5,148,728 to Mazurkiewicz; U.S. Pat. No. 4,563,924 to Runkle et al.; U.S. Pat. No. 5,388,487; U.S. Pat. No. 5,272,945 to Lockard; U.S. Pat. No. 5,378,091 to Nakamura; U.S. Pat. No. 4,848,198 to Royal et al.; U.S. Pat. No. 4,598,617 to Kubo et al.; U.S. Pat. No. 5,020,946 to Boettingen; U.S. Pat. No. 5,037,250 to Kenny; U.S. Pat. No. 2,635,399 to West Jr., U.S. Pat. No. 2,851,764 to White; U.S. Pat. No. 3,364,800 to Benjamin; and U.S. Pat. No. 5,346,325 to Harpaz.

While the area of providing cooling to cutting tools and to machined workpieces has received substantial attention, there remains need for additional systems and methods of controlably applying cooling to cutting tools very near to a workpiece contacting edge thereof.

DISCLOSURE OF THE INVENTION

As discussed in the Background Section of this Disclosure, where heat resistant materials are machined, it is important to effect tight intended temperature control of a machined material, (ie. workpiece), contacting edge of a cutting tool. While prior inventors have generally recognized this fact, no known prior art teaches that a cooling system and method of use thereof, for application in controlling the temperature of a workpiece contacting edge of a cutting tool, should be essentially infinitely adjustable within a range of adjustability, so as to allow positioning cooling means with respect to a machined material contacting edge of a cutting tool.

It is to be appreciated that when confronted with the task of machining a material, a user must identify the material, (eg. ceramic, titanium alloys, inconel alloys, super alloys, iron or cobalt based alloys, tantulum etc.), to be machined, and then select a cutting tool composed of an appropriate material, (eg. diamond, polycrystaline cubic boron nitride, cemented carbide, ceramics etc). Typically, for instance, ceramics are machined with cutting tools composed of cubic boron nitride, and cemented carbides are used to fashion cutting tools used to machine heat resistant alloys such as those containing titanium, and inconel. As alluded to, in use, it is necessary to control the temperature of the actual workpiece contacting edge of the cutting tool to prevent decomposition thereof. It is also to be appreciated that many materials, appropriate for use in forming a cutting tool, do not conduct heat well, (eg. ceramics). Therefore, cooling a cutting tool at a location removed from the workpiece contacting edge thereof can be a rather non-optimum, if not essentially ineffective, process.

The present invention provides a system and method of use thereof for providing cooling at a user adjustable proximity with respect to workpiece contacting edge of a cutting tool. This, it should be appreciated, allows a user to not only select an appropriate cutting tool material, but also allows said user to apply cooling to a cutting tool as near or as far removed, (within a range of adjustment), from a workpiece contacting edge of a cutting tool as is determined to be appropriate by said user to achieve optimum end workpiece machining results.

In this light, the present invention can be understood to be a system for machining workpiece materials comprising an insertable machining tool, said insertable machining tool presenting with a surface area immediately adjacent to a workpiece contacting edge thereof. Said system for machining workpiece material further comprises a means for supporting said insertable machining tool in a manner which leaves said surface area adjacent to said workpiece contacting edge accessible, while a means for effecting workpiece machining effecting relative motion between said insertable machining tool workpiece contacting edge, and a workpiece material, effects relative motion between said insertable machining tool workpiece contacting edge and said workpiece material.

Most importantly said present invention system for machining materials comprises a reservoir defining system which presents with inlet and outlet means, such that in use coolant can be cause to flow into, through and out of said reservoir provided by said reservoir defining system. Said reservoir defining system is, in use, affixed to said system for machining materials so as to form said reservoir adjacent to said surface area and in user adjustable proximity to said workpiece contacting edge of said cutting tool. In use, a coolant is caused to flow through said reservoir and cryogenically cool said reservoir and adjacent insertable machining tool, while said edge of said insertable machining tool contacts said workpiece material and relative motion is effected between said insertable machining tool workpiece contacting edge and said workpiece material. The end result being that said workpiece material is machined with the temperature at the workpiece contacting edge of said insertable machining tool being controlled by the presence of said flow of coolant such that insertable machining tool workpiece contacting edge wear is reduced.

It is to be appreciated that the reservoir defining system can be open at the position at which it contacts said accessible machining tool surface area so that entered coolant directly contacts said accessible machining tool surface area. A modified embodiment provides that said reservoir be essentially enclosed with access being only via coolant inlet and outlet means.

A method of machining workpiece materials which provides superior workpiece material machining results via control of the temperature of a workpiece contacting edge of an insertable cutting tool comprising, in a functional sequence:

a. providing a system for machining workpiece materials as described infra;

b. providing a workpiece material to said system for machining workpiece materials;

c. providing an insertable cutting tool of a selected material appropriate for machining the workpiece material and causing a workpiece contacting edge of said insertable cutting tool to contact said workpiece material;

d. providing a reservoir defining system which presents with inlet and outlet means, such that in use coolant can be caused to flow into, through and out of said reservoir provided by said reservoir defining system; said reservoir defining system being affixed to said system for machining materials so as to form said reservoir adjacent to said insertable cutting tool surface area and adjusting the proximity thereof to said insertable cutting tool workpiece contacting edge;

e. causing coolant to flow through said reservoir and cool said workpiece contacting edge of said insertable cutting tool; and f. causing workpiece material machining effecting relative motion between said workpiece contacting edge of said insertable cutting tool and said workpiece material;

to the end that the temperature of the workpiece contacting edge of the insertable cutting tool is closely controlled to be at a value at which insertable cutting tool workpiece contacting edge wear is reduced and at which improved workpiece material machining is achieved as evidenced by improved surface integrity as evidenced by reduced workpiece cracking, damage and deformation.

It is further noted that in use the flow rate, pressure and amount of coolant (eg. liquid nitrogen), caused to flow through the reservoir in a reservoir defining system can be controlled at the inlet and/or outlet means, in combination with the placement of said reservoir defining system in relationship to an insertable cutting tool machined material contacting edge.

It is also noted that adjustment of the relative positioning of a present invention reservoir defining system with respect to an insertable cutting tool workpiece contacting edge can be effected by adjustment of the positioning of the reservoir defining system and/or by the positioning of the insertable cutting tool in a tool holding system.

It should also be appreciated that various empirical and computer aided analytical means are available, or can be developed, which allow a user to arrive at optimum parameters, such as relative speed between workpiece contacting edge of said insertable cutting tool and said workpiece material, in combination with location of the reservoir defining system with respect to the workpiece contacting edge of said cutting tool, and coolant flow rate, pressure and amount cause to slow through a reservoir in a reservoir defining system.

The present invention system will be better understood by reference to the Detailed description Section of this Disclosure, with reference being had to the accompanying Drawings.

SUMMARY OF THE INVENTION

It is therefor a purpose of the present invention to provide a system for allowing user adjustable application of cutting tool lifetime increasing cooling to workpiece contacting edge of a cutting tool in a material machining system.

It is another purpose of the present invention to provide a system and method of use thereof which allows improved end results where materials such as ceramics, heat resistant materials, titanium and inconel are machined.

It is yet another purpose of the present invention to teach that a reservoir defining system should be applied in effecting cryogenic cooling of a workpiece contacting edge of a cutting tool.

It is still yet another purpose of the present invention to teach that a reservoir defining system applied in effecting cryogenic cooling of a workpiece contacting edge of a cutting tool should be infinitely adjustable in position with respect to said workpiece contacting edge of a cutting tool, within a range of adjustability.

DETAILED DESCRIPTION

Figure 1:
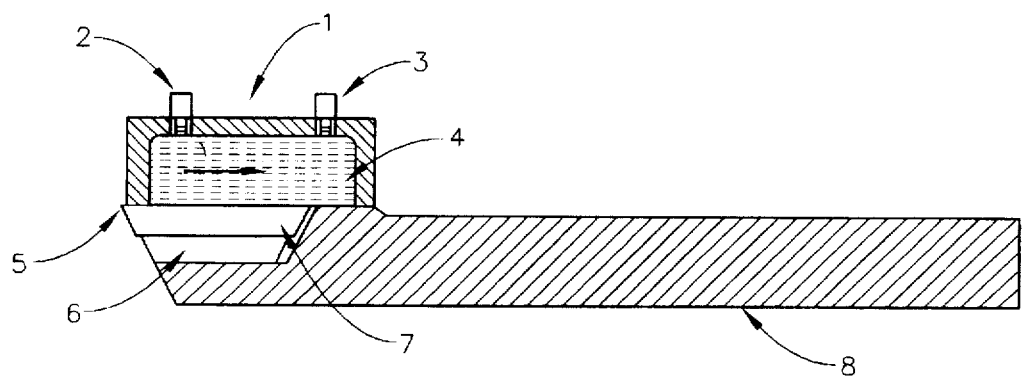
FIG. 1 shows, in elevation, a side cross-sectional view of the present invention reservoir defining system including a cutting tool and mounted to a tool holder.

Turning now to the Drawings, there is shown in FIG. 1 in side elevation, a cross-sectional view of a present invention reservoir (4) defining system (1), in combination with a cutting tool (7), which cutting tool (7) presents with a workpiece contacting edge (5). Said cutting tool (7) is shown supported by an support means (6), (eg. a shim), said support means (6) being situated appropriately in a tool holder (8). Also shown are inlet (2) and outlet (3) means which in use provide means by which a coolant can be caused to flow through said reservoir (4). It is to be noted that the present invention reservoir (4) defining system (1) can be considered to be a cap present atop a surface area (9), (see FIG. 3), of said cutting tool (7).

Figure 2:
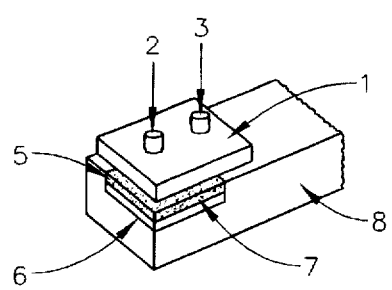
FIG. 2 shows a perspective view of the present invention system.

FIG. 2 shows a perspective view of the reservoir (4) defining system (1), including the inlet (2) and outlet (3) means. Said FIG. 2 also shows the cutting tool (7) and workpiece contacting edge (5), as well as the support means (6) and a cut-away portion of the toolholder (8).

Figure 3:
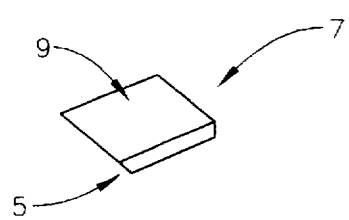
FIG. 3 shows a cutting tool accessible surface area and workpiece contacting edge thereof.

FIG. 3 shows a perspective view of the cutting tool (7), as viewed from the left and thereabove. It is to be noted that, a surface area (9) is present, and reference to FIGS. 1 and 2 show that said surface area (9) is accessible to said reservoir (4) defining system (1) when said cutting tool (7) is present in a FIG. 1 system. It is specifically pointed out that, in use, the surface area (9) is typically oriented to face upward, (as indicated in FIG. 1), and that the present invention reservoir (4) defining system (1) is oriented atop thereof.

A very important aspect of the present invention is that the reservoir (4) defining system (1) is of a shape which allows positioning the reservoir very near, (eg. within a milimeter or two), the workpiece contacting edge (5) of said cutting tool (7). In fact, it should be appreciated, by reference to FIGS. 1 and 2, that the reservoir (4) defining system (1) could be positioned so as to provide the volume of the reservoir (4) essentially above the workpiece contacting edge (5) of said cutting tool (1). Of course, it must be understood that the actual workpiece contacting edge (5) of cutting tool (7) must extend a bit beyond the reservoir (4) defining system (1) in use to contact a workpiece, but generally, a user of the present invention can effect the positioning of the reservoir (4) defining system (1) with respect to the workpiece contacting edge (5) of the cutting tool (7), as desired. It should be understood that this can be realized by adjustment of the position of the cutting tool (7) under the present invention reservoir (4) defining system (1) as well as by modifying the position at which the reservoir (4) defining system (1) is mounted to the toolholder (8).

Figure 4:
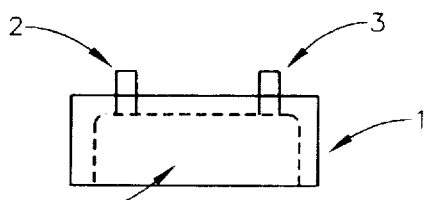
FIG. 4 shows an open reservoir defining system.
Figure 5:
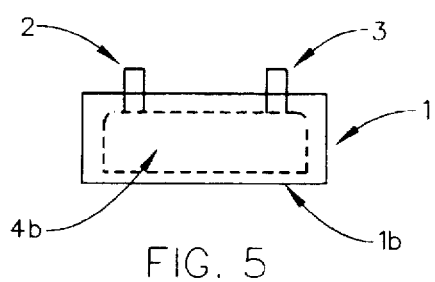
FIG. 5 shows an enclosed reservoir defining system.

FIGS. 4 and 5 show an open (4a) and enclosed (4b) reservoir (4) embodiment, respectively, of the present invention reservoir (4) defining system (1). Use of an open reservoir (4a) allows coolant passed through said open reservoir (4a) to make actual contact with the surface area (9) of said cutting tool (7), when said reservoir (4) defining system (1) and cutting tool (7) are arranged as shown in FIGS. 1 and 2. Of course the closed reservoir (4b) system of FIG. 5 provides cooling by way of conduction through the reservoir bottom (1b) material, when coolant is caused to flow through said reservoir (4b).

Figure 6A:
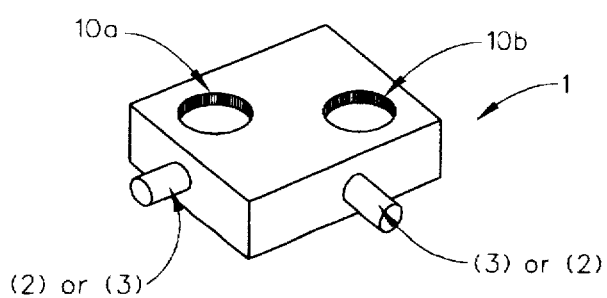
FIG. 6a shows a reservoir defining system with mounting means present thereon.
Figure 6B:
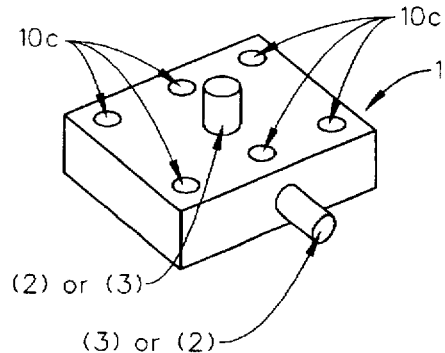
FIG. 6b shows a reservoir defining system with mounting means present thereon.

It is to be understood that while the inlet (2) and outlet (3) means are shown as being placed atop the horizontally oriented top of the reservoir (4) defining system (1) in FIGS. 1, 2, 4 and 5, as demonstrated in FIG. 6a, it is within the scope of the present invention, and Claims thereto, to place said inlet (2) and outlet (3) means at any vertically oriented side thereof. FIG. 6a also shows a elongated mounting holes can be present through which bolts are placed in use to secure the reservoir (4) defining system (1) to a toolholder (8). Appropriately placed Mating holes will, of course, be present in the toolholder (8). As well, it is to be noted that when mounted to a toolholder (8), the present invention reservoir (4) defining system (1) inlet (2) and outlet (3) means will typically be oriented distally from the workpiece contacting edge (5) of the reservoir (4) defining system (1). FIG. 6b shows that a modified embodiment can also provide a plurality of small holes for use in fixedly affixing the reservoir (4) defining system (1) to a toolholder (8). FIG. 6b also demonstrates another alterantive positioning of inlet (2) and outlet (3) means. It is also to be appreciated that while the present invention reservoir (4) defining system (1) is demonstrated as presenting with basically rectangular dimensions, any functional shape therefore is to be considered within the scope of the Claims.

It is disclosed that a typical reservoir (4) defining system (1) for use with stationary cutting tools in lathe systems is on the order of two to three centimeters square as viewed from above, (note this is shown as being a "cap" for mounting atop a cutting tool (7), in FIG. 2), will be a half to one or more centimenters in depth as viewed in side elevation, (as shown in FIG. 1), and have walls on the order of ten millimeters thick, (as indicated by the dotted lines in FIGS. 4 and 5). It is noted that typically, near a machined material contacting edge of a cutting tool, a present invention resivoir wall will be on the order of a tenth millimeter to a few millimeters thick.

Figure 7A:
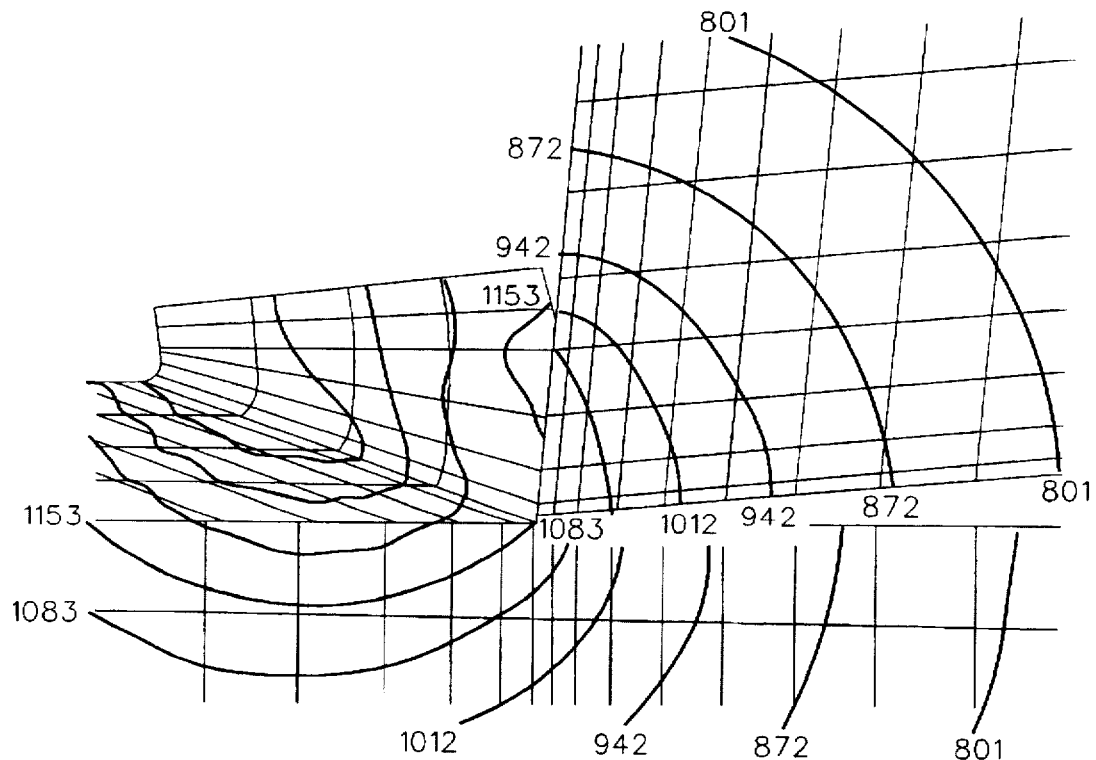
FIGS. 7a and 7b show calculated temperature profile curves, at and near the location of a cutting tool workpiece contacting edge, without and with present invention cooling applied, respectively. The cutting tool is cubic-boron-nitride and the machined material is a ceramic.
Figure 7B:
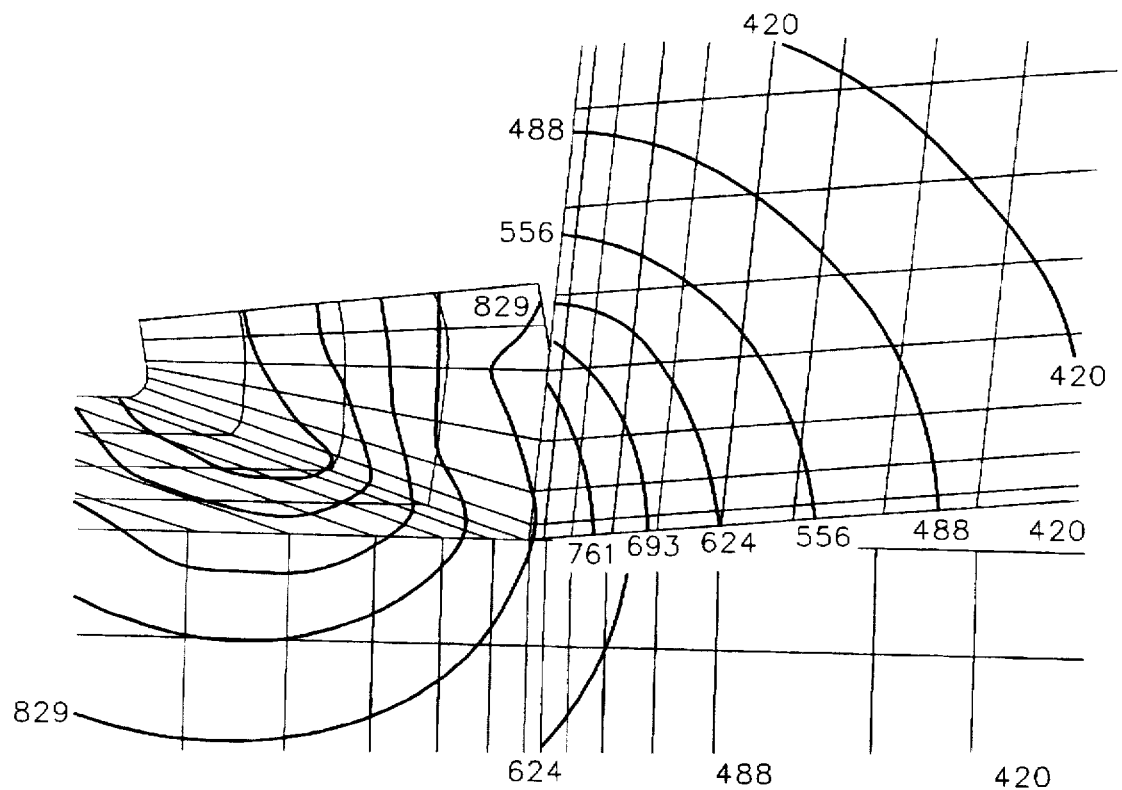
Figure 8A:
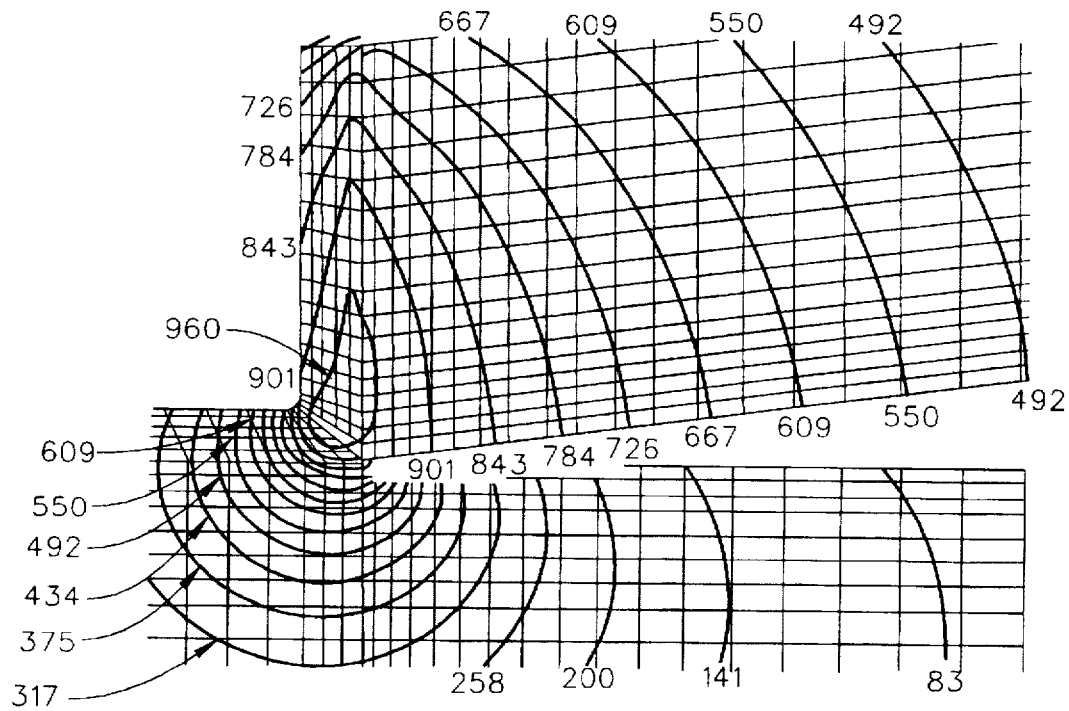
FIGS. 8a and 8b show calculated temperature profile curves, at and near the location of a cutting tool workpiece contacting edge, without and with present invention cooling applied, respectively. The cutting tool is cemented-carbide and the machined material is a titanium.
Figure 8B:
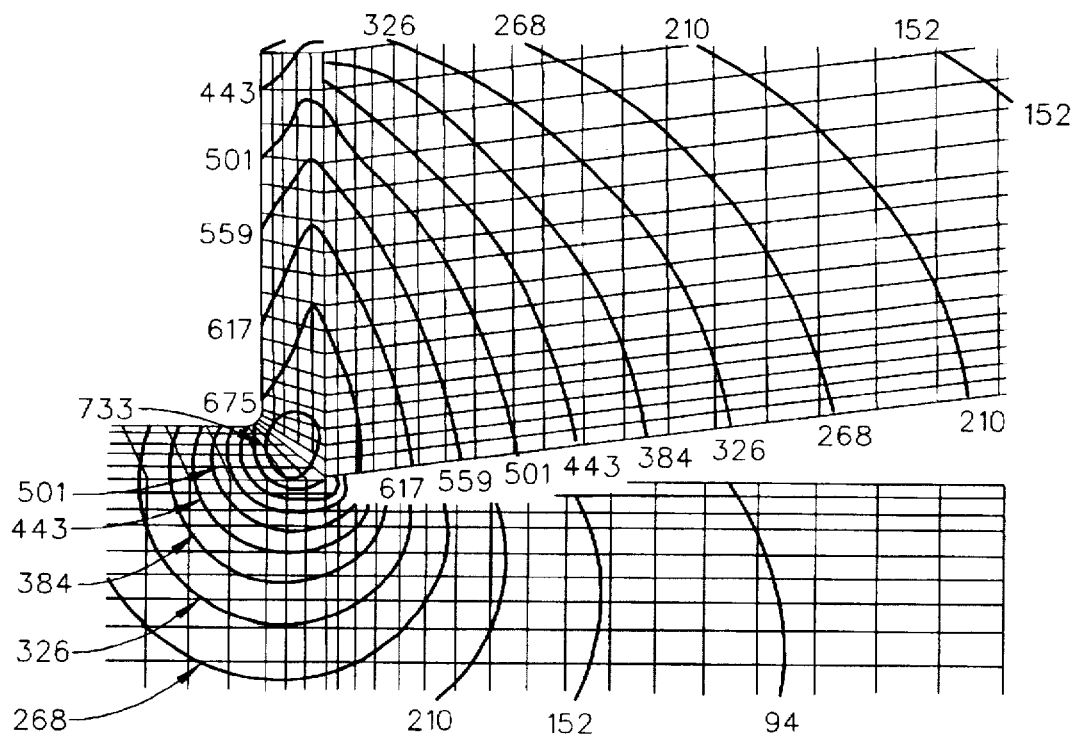

FIGS. 7a and 7b show, respectively, calculated temperature profiles in a cubic-boron-nitride cutting tool near the machined material contacting edge thereof applied to the machining of a ceramic workpiece material, without and with cooling applied by the present invention reservoir defining system. FIGS. 8a and 8b show similar calculated respective plots for a cemented carbide cutting tool and titanium workpiece material, respectively without and with cooling applied by the present invention reservoir defining system, where the machined material is titanium. To help with interpretation of FIGS. 7a, 7b, 8a and 8b, note that the cutting tool machined material contacting edge is present in the "upper right quadrant", with machined material being present in the other three quadrants. Note that machined material projects upward at the point of contact with said cutting tool machined material contacting edge, in the "upper left quadrant" in each of the FIGS. 7a, 7b, 8a and 8b. The present invention reservoir defining system is not shown but should be considered as present a bit beyond the range of the approximately one (1) milimeter of the cutting tool shown in said FIGS. 7a, 7b, 8a and 8b.

Figure 9A:
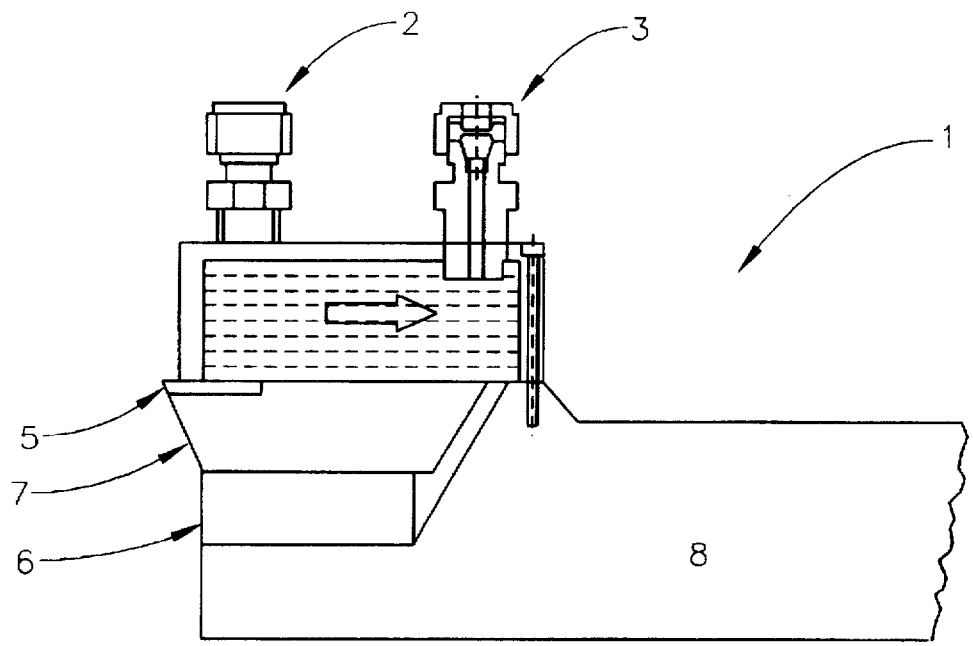
FIG. 9a shows, in elevation, another side cross-sectional view of a present invention reservoir defining system including a cutting tool and mounted to a tool holder.
Figure 9B:
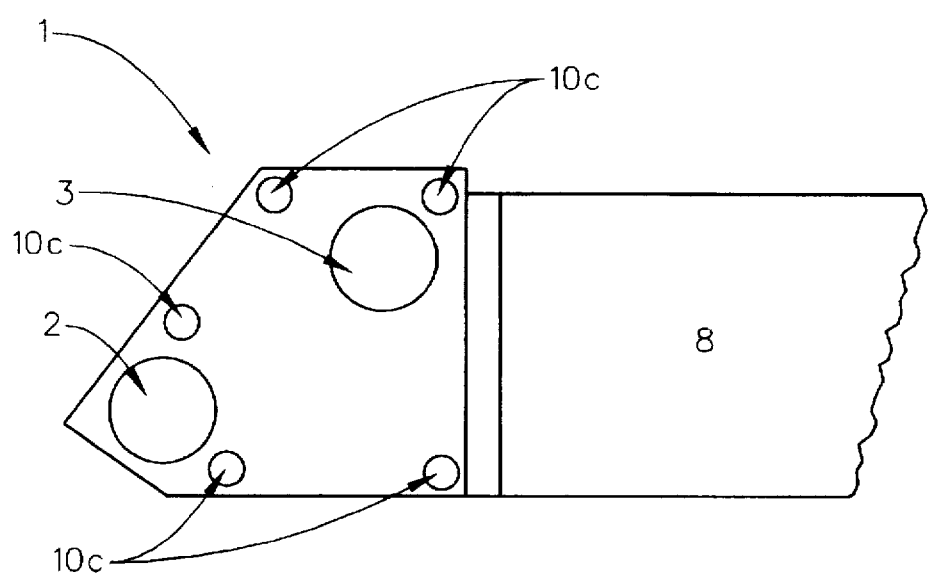
FIG. 9b show a present invention reservoir defining system with mounting means present thereon.

FIG. 9a shows, in elevation, another side cross-sectional view of a present invention reservoir defining system including a cutting tool and mounted to a tool holder. FIG. 9b show a present invention reservoir defining system with mounting means present thereon. The element identifiers are the same as used in earlier Figures.

Having hereby disclosed the subject matter of the present invention, it should be obvious that many modifications, substitutions, and variations thereof are possible in light thereof. It is therefore to be understood that the present invention can be practiced other than as specifically described, and should be limited in breadth and scope only by the Claims.

I claim:

1. A system for machining workpiece material comprising an insertable cutting tool, said insertable cutting tool presenting a surface area immediately adjacent to a workpiece material contacting edge thereof; said system for machining workpiece material further comprising a means for supporting said insertable cutting tool in a manner which leaves said surface area immediately adjacent to said workpiece material contacting edge accessible to a means for providing cooling, while a means for effecting relative motion between a workpiece material and said insertable cutting tool workpiece material contacting edge effects relative motion between said insertable cutting tool workpiece material contacting edge and said workpiece material; wherein said means for providing cooling is a cap-like reservoir defining system which presents with inlet and outlet means, such that coolant can be caused to flow into, via said inlet means through, and out of, via said outlet means, a reservoir provided by said reservoir defining system; said reservoir defining system being affixed to said system for machining materials so as to position said reservoir adjacent to said cutting tool surface area which is immediately adjacent to said workpiece material contacting edge; such that in use, a coolant is caused to flow through said reservoir and cryogenically cool said reservoir and insertable cutting tool workpiece material contacting edge without said coolant exiting said reservoir, contacting and directly significantly cooling said workpiece material being machined while said workpiece material contacting edge of said insertable cutting tool contacts a workpiece material and relative motion is effected between said insertable cutting tool workpiece contacting edge and said workpiece material, to the end that said workpiece material is machined with a temperature at the workpiece material contacting edge of said insertable cutting tool which is reduced by the presence of said flow of coolant, the purposes of effecting said temperature reduction being to reduce wear of said insertable cutting tool workpiece material contacting edge, while enabling achievement of improved workpiece machined material surface integrity as exemplified by reduced machined material cracking, damage and deformation.

2. A system for machining workpiece materials as in claim 1, in which the reservoir is open and coolant entered to said reservoir defining system directly contacts said accessible cutting tool surface area immediately adjacent to said workpiece material contacting edge.

3. A system for machining workpiece materials as in claim 1, in which the reservoir is closed and coolant entered to said reservoir defining system does not directly contact said accessible cutting tool surface area immediately adjacent to said workpiece material contacting edge.

4. A system for machining workpiece materials as in claim 1, in which the reservoir is positioned on the accessible cutting tool surface area immediately adjacent to said workpiece material contacting edge so as to be within two (2) millimeters of the workpiece material contacting edge.

5. A system for machining workpiece materials as in claim 1 in which said means for supporting said insertable cutting tool in a manner which leaves said surface area adjacent to said workpiece contacting edge accessible to a means for providing cooling, does not comprise coolant carrying channels therein which can reduce strength thereof.

6. A system for machining workpiece materials as in claim 1, in which said surface area immediately adjacent to a workpiece material contacting edge of said insertable cutting tool faces upward in use.

7. A system for machining workpiece materials as in claim 1, In which the reservoir providing system is positioned on the accessible cutting tool surface area so as to be present at a user determined distance from said insertable cutting tool workpiece material contacting edge.

8. A method of machining workpiece material which provides superior workpiece material machining results via control of the temperature of a workpiece material contacting edge of an insertable cutting tool comprising, in a functional sequence:

a. providing a system for machining workpiece material comprising an insertable cutting tool, said insertable cutting tool presenting a surface area immediately adjacent to a workpiece material contacting edge thereof; said system for machining workpiece material further comprising a means for supporting said insertable cutting tool in a manner which leaves said surface area immediately adjacent to said workpiece material contacting edge accessible to a means for providing cooling, while a means for effecting relative motion between a workpiece material and said insertable cutting tool workpiece material contacting edge effects relative motion between said insertable cutting tool workpiece contacting edge and said workpiece material; wherein said means for providing cooling is a cap-like reservoir defining system which presents with inlet and outlet means, such that coolant can be caused to flow into, via said inlet means, through, and out of, via said outlet means, a reservoir provided by said reservoir defining system; said reservoir defining system being affixed to said system for machining materials so as to position said reservoir adjacent to said cutting tool surface area which is immediately adjacent to said workpiece material contacting edge; such that in use, a coolant is caused to flow through said reservoir and cryogenically cool said reservoir and insertable cutting tool workpiece material contacting edge without said coolant exiting said reservoir, contacting and directly significantly cooling said workpiece material being machined while said workpiece material contacting edge of said insertable cutting tool contacts a workpiece material and relative motion is effected between said insertable cutting tool workpiece material contacting edge and said workpiece material, to the end that said workpiece material is machined with a temperature at the workpiece material contacting edge of said insertable cutting tool which is reduced by the presence of said flow of coolant, the purposes of effecting said temperature reduction being to reduce wear of said insertable cutting tool workpiece material contacting edge, while enabling achievement of improved workpiece machined material surface integrity as exemplified by reduced machined material cracking, damage and deformation;

b. providing a workpiece material to said system for machining workpiece material;

c. providing an insertable cutting tool of a selected material appropriate for machining the workpiece material and causing a workpiece material contacting edge of said insertable cutting tool to contact said workpiece material;

d. securing said reservoir defining system in said system for machining workpiece materials so as to place said reservoir in user desired proximity to said insertable cutting tool workpiece contacting edge;

e. causing coolant to flow through said reservoir and cool said workpiece material contacting edge of said insertable cutting tool; and f. causing workpiece material machining effecting relative motion between said workpiece contacting edge of said insertable cutting tool and said workpiece material;

to the end that the temperature of the workpiece material contacting edge of the insertable cutting tool is controlled to be at a level at which insertable cutting tool workpiece material contacting edge wear is reduced, and improved workpiece material machining is achieved as evidenced by improved workpiece machined material surface integrity as exemplified by reduced machined material cracking, damage and deformation.

9. A system for machining workpiece material comprising an insertable cutting tool, said insertable cutting tool presenting an upper surface area immediately adjacent to a workpiece material contacting edge thereof; with means present therein for supporting the underside of said insertable cutting tool in a manner which leaves said upper surface area immediately adjacent to said workpiece material contacting edge accessible to a means for providing cooling, while a means for effecting relative motion between a workpiece material and said insertable cutting tool workpiece material contacting edge effects relative motion between said insertable cutting tool workpiece contacting edge and a workpiece material; wherein said means for providing cooling is a cap-like reservoir defining system which presents with inlet means and outlet means, such that coolant can be caused to flow into, via said inlet means, through, and out of, via said outlet means, a reservoir provided by said reservoir defining system; said reservoir defining system being affixed to said system for machining materials so as to position said reservoir adjacent to said cutting tool upper surface area which is immediately adjacent to said workpiece material contacting edge; such that in use, a coolant is caused to flow through said reservoir and cryogenically cool said reservoir and insertable cutting tool workpiece material contacting edge without said coolant exiting said reservoir, contacting and directly significantly cooling said workpiece material being machined while said workpiece material contacting edge of said insertable cutting tool contacts a workpiece material and relative motion is effected between said insertable cutting tool workpiece material contacting edge and said workpiece material; to the end that said workpiece material is machined with a temperature at the workpiece material contacting edge of said insertable cutting tool which is reduced by the presence of said flow of coolant, the purposes of effecting said temperature reduction being to reduce wear of said insertable cutting tool workpiece material contacting edge, while enabling achievement of improved workpiece machined material surface integrity as exemplified by reduced machined material cracking, damage and deformation.

* * * * *